May 22, 1934.　　　W. SCHUBERT　　　1,959,551
DEVICE FOR TESTING THE POSITIONS OF THE DRIVING SHAFTS OF LOCOMOTIVES
Filed July 8, 1932
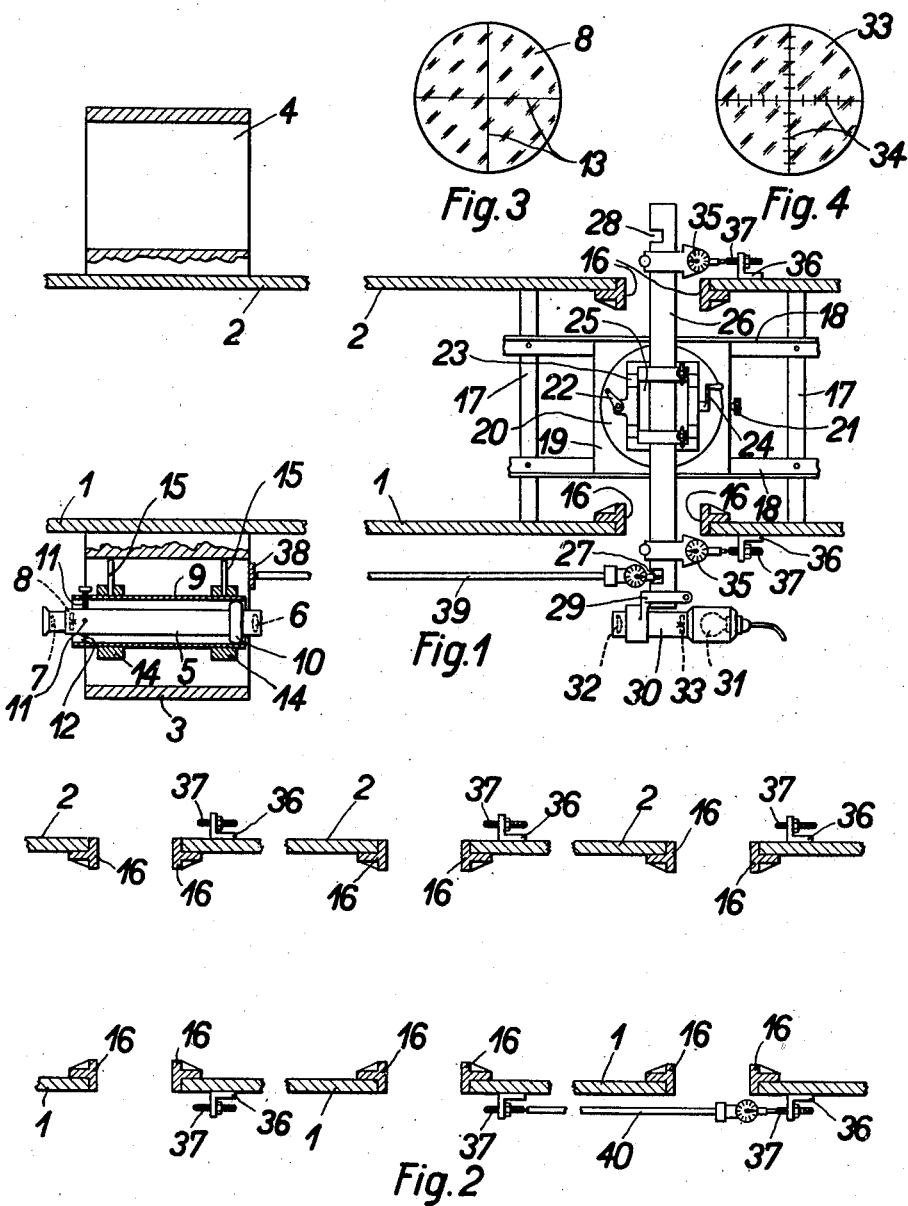
Inventor:
Walter Schubert Patented May 22, 1934

1,959,551

UNITED STATES PATENT OFFICE 1,959,551

DEVICE FOR TESTING THE POSITIONS OF THE DRIVING SHAFTS OF LOCOMOTIVES

Walter Schubert, Oels, Germany, assignor to the firm of Carl Zeiss, Jena, Germany Application July 8, 1932, Serial No. 621,397 In Germany July 13, 1931

2 Claims. (Cl. 88—14)

I have filed an application in Germany, July 13, 1931.

The British Patent Specification 262,412 concerns a device for testing the mutual positions of the driving shafts of a machine. The use of this device, which is an optical instrument and offers the advantage of great measuring accuracy, is specially suitable when two shafts the mutual positions of which are to be examined embrace an angle, that is to say, when these shafts are not parallel. The task of examining the positions of the driving or coupling shafts of locomotives may be effected by means of this device by determining the position of each of the said driving shafts relatively to the cylinder axis.

With the new device, the said optical examination is effected only for testing one driving shaft, the examination being continued by mechanically testing the driving shafts parallel to the one examined optically. This second examination may be of equal accuracy and affords a comparatively great economy of time. Testing the driving shafts of locomotives is effected as follows: By means of a telescope having a definite position with respect to the cylinder axis, the direction of a straight line (for instance a mark carrier representing a straight line) is determined and the position of this line measured relatively to the axis of the pair of bearings of a driving shaft in the locomotive frame, whereupon points are determined on the side plates of the frame by means of mechanical fine-measuring devices, these points indicating the requisite positions of the driving shafts.

This method is carried into effect substantially by means of the device described in the British Patent Specification 262,412. However, the present purpose makes it advisable to use a device in which the axis of the mark carrier is determined by at least one collimator at right angles to this axis and imaging a mark at a great distance, and in which device the mark carrier is displaceable in the direction of its axis as well as in that of the longitudinal axis of the frame bearers and rotatable about an axis at right angles to these two directions. The side plates of the frame are conveniently provided with adjustable stops for the determination of the requisite positions of the driving shafts. It is specially advantageous to use as stops end gauges attached to the side plates and adjustable in the measuring direction.

The accompanying drawing represents as a constructional example of the invention two schematical plan views of a device for testing the positions of the driving shafts in a locomotive frame. Figure 1 illustrates those parts of a locomotive frame in which are provided the cylinders and the driving shaft bearings that are farthest from these cylinders. Figure 2 shows parts of the frame with all driving shaft bearings. Figures 3 and 4 represent in top views two single parts of the device.

The two side plates are designated 1 and 2, and the two cylinders, 3 and 4. In the cylinder 3, a telescope 5 the optical parts of which are an objective 6 and an adjustable ocular 7, a mark being disposed in the focal plane of this ocular, is mounted at one end in a tubular intermediate body 9 by means of a ball-shaped collar 10 and, at its other end, by means of two set screws 11 and counter springs 12. Through the medium of these set screws 11, the telescope may be adjusted about a point of its optical axis in two directions at right angles to each other. The mark plate 8 (Figure 3) is provided with a reticule 13 indicating the optical axis of the telescope 5. The intermediate body 9 has two sleeves 14. In corresponding holes in these sleeves 14 are radially disposed three equidistant rods 15 each, these rods being of a construction similar to that of cylindrical end gauges and holding the accurately ground exterior surface of the intermediate body 9 in correct position with respect to the bore of the cylinder 3.

In the side plates 1 and 2, those apertures for the driving shaft bearings which are farthest from the cylinder 3 are provided with shoulders 16 for holding the bearings. The side plates 1 and 2 are interconnected by stays 17 to which are fixed two guide rails 18 parallel to the longitudinal directions of the side plates 1 and 2. A plate 19 is displaceable along these guide rails 18. On the plate 19 is provided a disc 20 which is rotated by means of a milled head 21 and carries a slide guide 23 altitudinally adjustable by means of a crank 22. On this slide guide 23 rests a support 25 for the mark carrier, this support having two clamps and being displaceable in the direction of the side plates 1 and 2 by means of a crank 24. The purpose of the clamps is to hold a mark carrier 26 having two recesses 27 and 28 the base surfaces of which serve as gauging surfaces and determine the axis of the mark carrier 26. Near the recess 27 is clamped a holder 29 for a collimator 30. This collimator 30 contains a light source 31, a collimator objective 32 and a frosted glass plate 33 (Figure 4) one surface of which lies in the focal plane of the objective 32 and has two scales 34 intersecting at 90°, the point of intersection of these scales indicating the collimator axis. Two measuring clocks 35 are so clamped to the mark carrier 26 that the ends of their gauge rods are at a definite normal distance from the axis of the mark carrier 26 when their hands assume a definite position. To the exterior sides of the side plates 1 and 2, near the holes for the bearings of the driving shafts, are fixed angle-irons 36 in which threaded end gauges are adjustable parallel to the frame axis. The device is completed by a ruler 38 and end gauges 39, 40 each of which is provided with a measuring clock. When the hands of these clocks are at definite positions, the said end gauges indicate the distance of the centre of the cylinder from the axis of the farthest driving shaft bearing, reduced by the sum of half the cylinder length and the thickness of the ruler 38, or the distance apart of two driving shafts.

When the driving shafts are to be tested, the locomotive frame 1, 2 is given in the known manner a horizontal position. The telescope 5, the optical axis of which is assumed to be adjusted in parallel to the ground surface of the intermediate body 9, is placed on the guide face of one of the cylinders, for instance of cylinder 3, by means of the end gauge 15. The plate 19 is placed on the guide rails 18, and the mark carrier 26 is so fixed in the clamps of the support 25 that approximately equal portions of both its ends protrude over the side plates 1 and 2, respectively. By means of a water level, the collimator 30 is adjusted horizontally and, by turning the head 21, the mark carrier is adjusted approximately at right angles to the longitudinal axis of the side plates 1 and 2. By displacing the support 19 on the guide rails 18, the mark carrier 26 is now so adjusted that its axis approximately divides by halves the aperture between the shoulders 16. By means of the crank 22, this mark carrier is displaced upwardly until the axis of the collimator 30 is at equal height with the axis of the telescope 5. When the telescope 5 offers in this position a view in which the vertical line of the reticule 13 laterally deviates from the vertical line of the reticule 34, the axis of the mark carrier 26 is not exactly at right angles to the axis of the cylinder 3. By turning the milled head 21, the required exact position is arrived at without any difficulty. The ruler 38 and the gauge 39 having been applied, the crank 24 is so turned that the distance of the axis of the mark carrier 26 from the centre of the cylinder 3 is adjusted to the necessary value. The axis of the mark carrier 26 now coincides with the requisite position of the axis of the driving shaft bearing, this bearing now being determined by displacing the end gauges 37 in the angle-irons until the measuring clocks 35 indicate the required value. If the telescope 5 offers the view of an altitudinal difference of the two reticules 13 and 34, the cylinder 3 has a faulty inclination the magnitude of which can be read in angles when the division 34 is divided accordingly. By setting the screws 11 until the altitudinal deviation of the two reticules 13 and 34 disappears, the optical axis of the telescope 5 may be made to conform to the requisite position of the cylinder axis. The examination is repeated in the same manner for the cylinder 4, the telescope being introduced into this cylinder and the collimator 30 fixed to the other end of the mark carrier 26. When determining the requisite positions of the other driving shaft bearings, one has to begin with the end gauges 37 adjusted by means of the mark carrier 26. In this measuring process, the mark carrier 26 is no longer required and therefore removed from the clamps of the support 25. The other end gauges 37 at the two side plates 1 and 2 are now adjusted one after the other by means of the end gauge 40.

I claim:

1. A device for examining the positions of the driving shafts in the side plates of the frame of a locomotive, comprising a telescope, a mark carrier, a collimator disposed on the mark carrier, this collimator being at right angles to the axis of the mark carrier and provided with a mark, means so supporting the mark carrier as to make it displaceable in the direction of its axis as well as in that of the axis of the frame, these means being fixed to the side plates, means so supporting the mark carrier as to make it rotatable about an axis at right angles to the said two directions, and adjustable stops attached to the side plates.

2. A device for examining the positions of the driving shafts in the side plates of the frame of a locomotive, comprising a telescope, a mark carrier, a collimator disposed on the mark carrier, this collimator being at right angles to the axis of the mark carrier and provided with a mark, means so supporting the mark carrier as to make it displaceable in the direction of its axis as well as in that of the axis of the frame, these means being fixed to the side plates, means so supporting the mark carrier as to make it rotatable about an axis at right angles to the said two directions, and end gauges adjustably attached to the side plates.

WALTER SCHUBERT.